UNITED STATES PATENT OFFICE.

FREDERICK W. BROWN, OF FLORENCE, AND GEORGE W. BARTHOLOMEW, OF DENVER, COLORADO.

HYDRAULIC CEMENT.

1,020,124.     Specification of Letters Patent.     Patented Mar. 12, 1912.

No Drawing.     Application filed December 22, 1908. Serial No. 468,740.

*To all whom it may concern:*

Be it known that we, FREDERICK W. BROWN, of Florence, and GEORGE W. BARTHOLOMEW, of Denver, in the counties of Fremont and Denver and State of Colorado, have invented certain new and useful Improvements in Hydraulic Cement; and we do hereby declare the following to be a full, clear, and exact description of the invention, such as will enable others skilled in the art to which it appertains to make and use the same.

This invention relates to a new and improved hydraulic cement and the process of producing hydraulic cement from a mixture of suitable highly basic iron slag, sulfate of lime, Portland cement and chlorate of calcium.

Hydraulic cement is usually manufactured by mixing clay and carbonate of lime in such proportions that after calcination the resulting compound will contain about fifty to sixty-four parts of lime, twenty-two to twenty-eight parts silica, six to ten parts alumina and three to five parts iron with minute parts of soda, potash and sulfuric acid.

The object of this invention is to reduce the cost and improve the quality of the cement by making same of highly basic iron slag, sulfate of lime, Portland cement and chlorate of calcium. The economy comes from the use of the slag, a by-product of the iron furnace, and the improved quality is brought about by the peculiar chemical combination produced from the mixture and treatment proposed.

The method is to mix and grind highly basic molten slag, or slag that has been thoroughly chilled in water, air or otherwise, with two and one-half to twenty per cent. of sulfate of lime, two to fifty per cent. of Portland cement and one to ten per cent. of chlorate of calcium.

Having fully described our invention what we claim as new and desire to secure by Letters-Patent, is:—

1. A composition of matter resulting from the mixture of slag, cement, chlorate of calcium and sulfate of lime in the proportions substantially as specified.

2. A composition of matter resulting from the mixture of chilled furnace slag, hydraulic cement, chlorate of calcium and sulfate of lime, in the proportions substantially as specified.

In testimony whereof, we have signed this specification in the presence of two subscribing witnesses.

FREDERICK W. BROWN.
    GEORGE W. BARTHOLOMEW.

Witnesses as to the signature of Frederick W. Brown:
    J. W. HOLMES,
    EDNA A. FOSTER.

Witnesses as to the signature of George W. Bartholomew:
    GAIL B. HAMER,
    WILBUR NEWTON.

---

Copies of this patent may be obtained for ten cents each, by addressing the "Commissioner of Patents, Washington, D. C."